United States Patent
Yang et al.

(12)

(10) Patent No.: US 6,475,944 B1
(45) Date of Patent: Nov. 5, 2002

(54) VANADIA CATALYST IMPREGNATED ON TITANIA-PILLARED CLAY FOR THE REMOVAL OF NITROGEN OXIDE

(75) Inventors: Hee-Sung Yang, Ulsan-Si (KR); Seok-Lyong Song, Ulsan-Si (KR); Hyun-Chul Choi, Ulsan-Si (KR); In-Sik Nam, Hyoja-Dong (KR); Ho-Jeong Chae, Hyoja-Dong (KR)

(73) Assignee: Hyundai Heavy Industries Co., Ltd., Ulsan-Si (KR)

( * ) Notice: Subject to any disclaimer, the term of this patent is extended or adjusted under 35 U.S.C. 154(b) by 0 days.

(21) Appl. No.: 09/535,747

(22) Filed: Mar. 27, 2000

(51) Int. Cl.[7] ............................ B01J 21/16; B01D 53/56
(52) U.S. Cl. ........................................ 502/84; 423/239.1
(58) Field of Search ................... 502/80, 84; 423/239.1

(56) References Cited

U.S. PATENT DOCUMENTS 5,415,850 A * 5/1995 Yang et al. ............... 423/239.1

OTHER PUBLICATIONS

Long et al., Selective catalytic reduction of NO with ammonia over V2O5 doped TiO2 pillared clay catalysts, Applied Catalysis B: Environmental, vol. 24, (2000) pp. 13–21.*

* cited by examiner

*Primary Examiner*—Wayne A. Langel
*Assistant Examiner*—Maribel Medina
(74) *Attorney, Agent, or Firm*—Arent Fox Kintner Plotkin & Kahn

(57) ABSTRACT

A catalyst for effectively removing NOx by using $NH_3$ as a reducing agent is disclosed. Particularly, a vanadia impregnated onto Ti-PILC (titania-pillared interlayer clay) is disclosed, which is prepared by the generally known technology. More specifically, a $V_2O_5$/Ti-PILC catalyst is disclosed, in which NOx contained in the flue gas from an electric power plant and the like (an excessive amount of $SO_2$ being present in the flue gas stream) is reacted with $NH_3$ (which is injected as a reducing agent) over a vanadia impregnated onto a Ti-PILC, so that they can be converted into harmless nitrogen and water. The $V_2O_5$/Ti-PILC catalyst is employed for reducing NOx contained in the exhaust gas stream as well as the large amounts of $SO_2$ into nitrogen and water. The catalyst is prepared by pillaring a titania to a clay by a pillaring method. The $V_2O_5$/Ti-PILC catalyst prepared in the present invention reveals a superior NO removal activity under dry and wet conditions compared with the commercial $V_2O_5$—$WO_3$/$TiO_2$ catalyst.

16 Claims, 3 Drawing Sheets

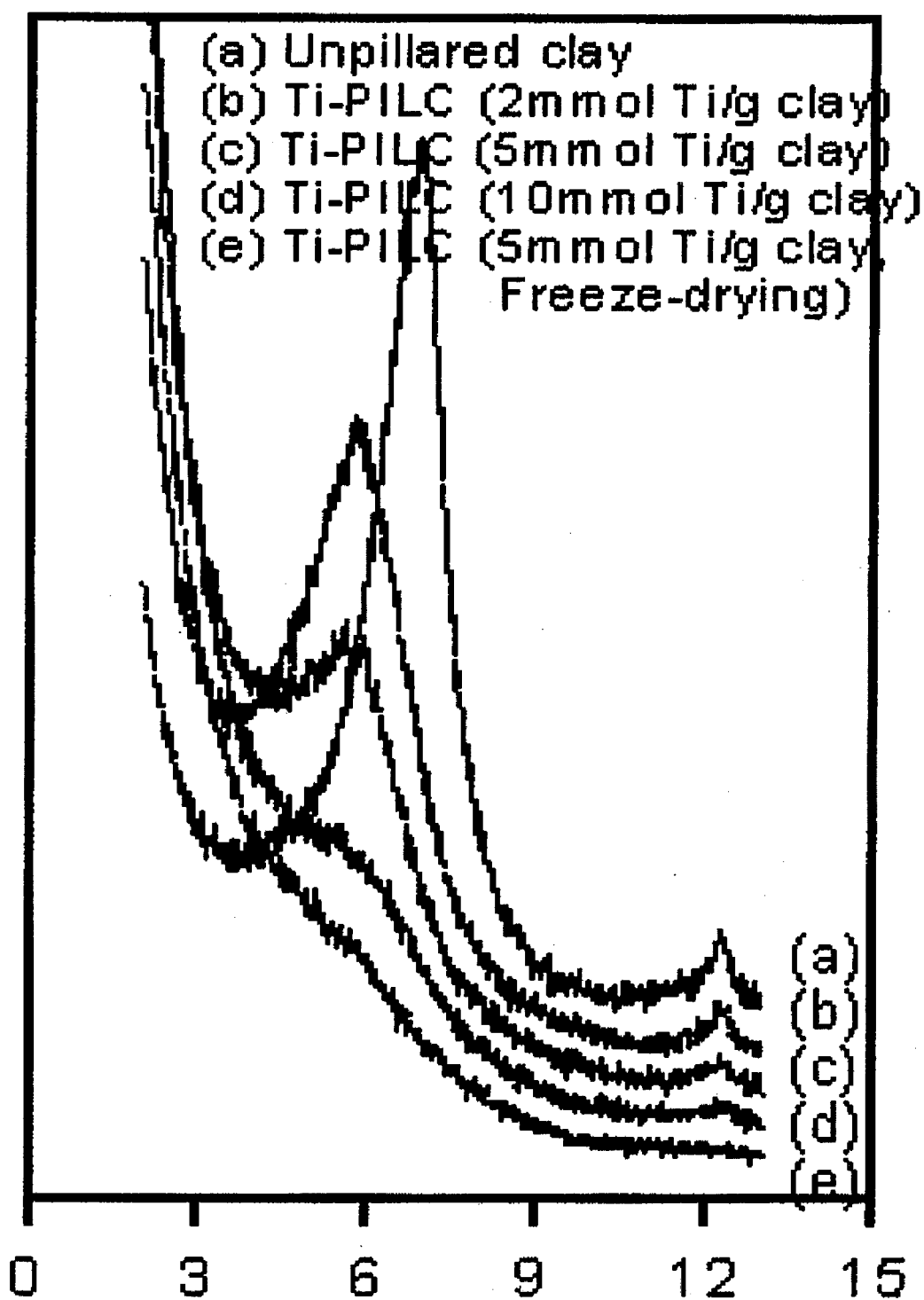
FIG. 1. XRD pattern of Ti-PILCs

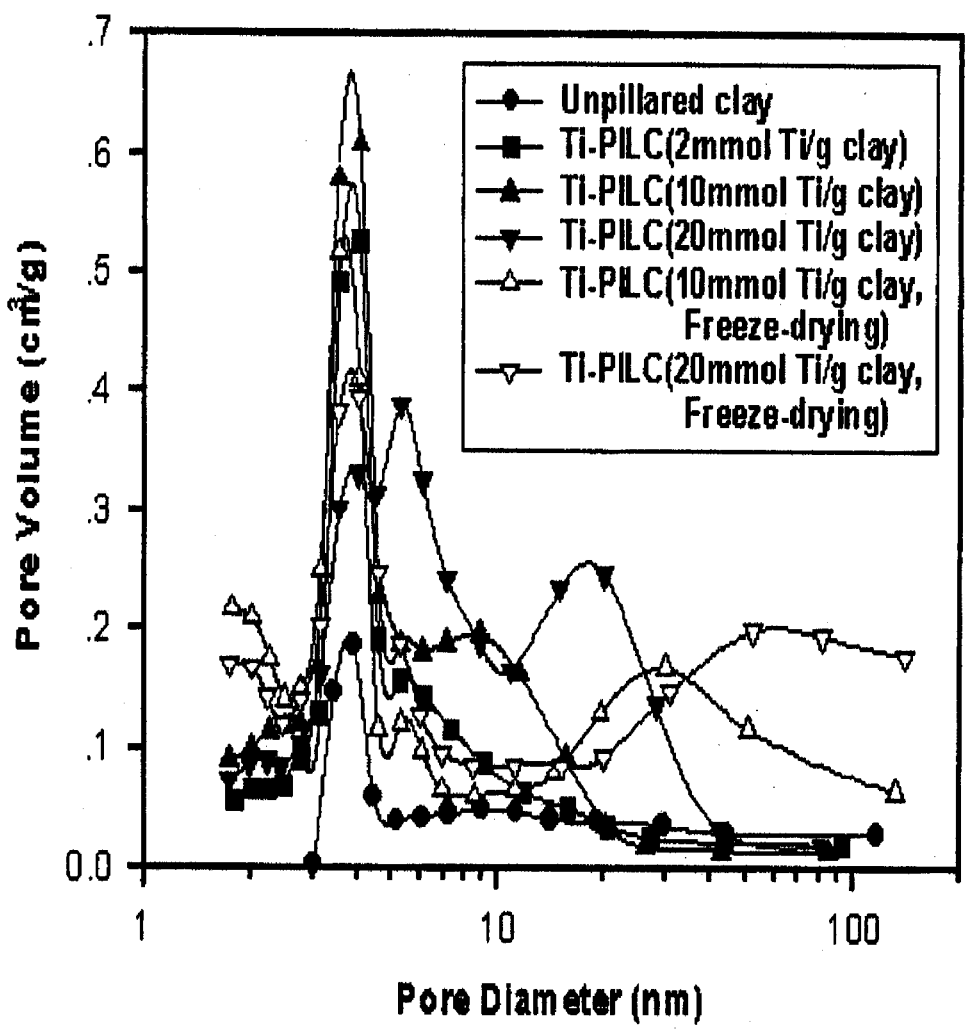
FIG. 2. Pore size distribution of Ti-PILCs.

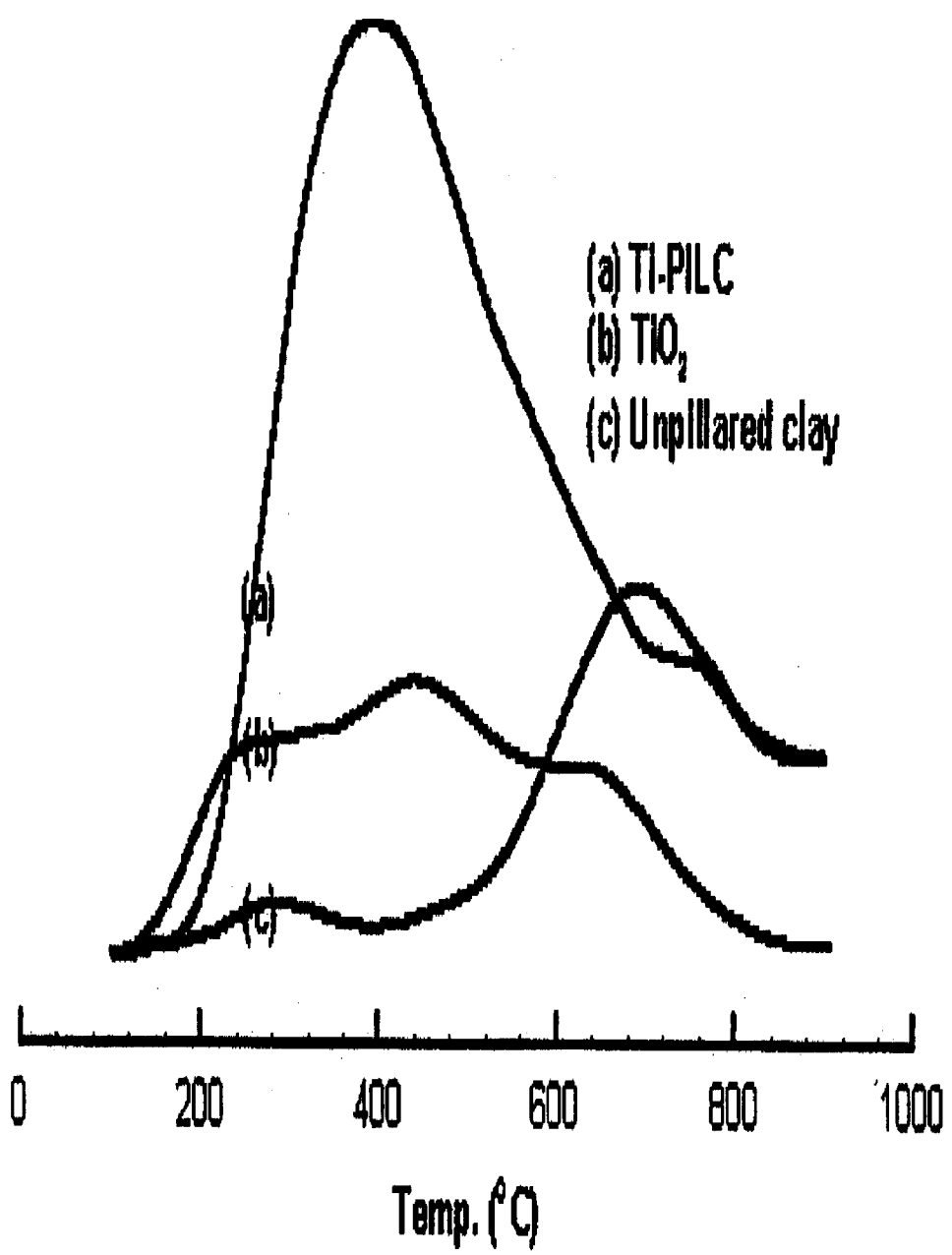
FIG. 3 $NH_3$ TPD spectra.

VANADIA CATALYST IMPREGNATED ON TITANIA-PILLARED CLAY FOR THE REMOVAL OF NITROGEN OXIDE

FIELD OF THE INVENTION

The present invention relates to a catalyst for effectively removing nitrogen oxides (NOx) by using ammonia ($NH_3$) as a reducing agent. Particularly, the present invention relates to a Ti-PILC (titania-pillared interlayer clay) catalyst impregnated by vanadia, which is manufactured by the generally known technology. More specifically, the present invention relates to a vanadia catalyst impregnated onto a Ti-PILC, in which a NOx contained in the exhaust system from an electric power plant and the like (an excessive amount of $SO_2$ included in the flue gas) is reacted with $NH_3$ (which is injected as a reducing agent) over a vanadia catalyst impregnated onto a Ti-PILC, so that they can be converted into nitrogen and water.

BACKGROUND OF THE INVENTION

Many countries have been making efforts for the progress of their own industries, and in this process, they are commonly encountered with a serious environmental pollution and contamination. Particularly, since 1980's, the global warming problem, the damage of the ozone layer and the acid rain are adding the seriousness to the environmental pollution and contamination. In this context, the importance of keeping the environmental safety is drawing an attention. NOx is chemical compound which causes the formation of the acid rain and the photochemical smog. Therefore, NOx is considered as the main source for the environmental pollution and contamination. Therefore, the industrialized nations such as the United States, Germany, Japan and others are strengthening the regulations on the emissions of NOx, and the regulations also become to be reinforced in Korea.

NOx occurs from the electric power plants, internal combustion engines and the manufacturing process of nitric acid. They include seven compounds such as nitrogen monoxide (NO), nitrogen dioxide ($NO_2$), nitrogen trioxide ($NO_3$), nitrous oxide ($N_2O$), dinitrogen trioxide ($N_2O_3$), dinitrogen tetraoxide ($N_2O_4$), and dinitrogen pentaoxide ($N_2O_5$). However, those which are contained in the atmospheric air are mainly $N_2O$, NO and $NO_2$. Generally, NOx indicates NO and $NO_2$, but the most of NOx which is emitted from electric power plants and automobiles are NO. Therefore, it is important to develop a technology for lowering the release of this compound.

Recently, the variety of technology for removing NOx from electric power plants have been developed, and among them, the selective catalytic reduction (SCR) method is the one which is satisfactory in the technical, economical and legal aspects. In this technology, NOx is removed from the exhaustion gas by using a catalyst, and therefore, the dependence of the catalyst on the total cost of the process is significant. The wide spectrum of the catalysts has been suggested from metal oxide catalysts to zeolite catalysts. The catalyst can be easily deactivated due to the sulfur compounds commonly contained flue gas. However, vanadia-titania catalyst has been generally known as the sulfur tolerance SCR catalyst. Since the catalyst is employed for treating the large amount of flue gas which is discharged from electric power plants and the like, it should be superior in the mechanical strength and in the formability into the low pressure drop reactor such as honeycomb. The titania fixed catalyst contains strong sulfur tolerance and high NO removal activity. However, there are drawbacks for the catalyst such as a high cost, a low specific surface area, and a weak mechanical strength. Therefore, the SCR catalyst should exhibit high NO removal activity with strong physico-chemical properties, and furthermore, it should be tolerable to the poisoning of the catalyst caused by $SO_2$, the alkaline metals such as sodium (Na), calcium (Ca), and potassium (K), and arsenic trioxide ($As_2O_3$).

Since 1970's, there have been intensive researches to develop the SCR catalyst for the removal of NO by $NH_3$. In U.S. Pat. No. 4,048,112 (dated 1976) by Matsushita et al., a catalyst is disclosed in which vanadia is impregnated onto titania. Since that time, many researches have been carried out on the vanadia-titania catalysts. Further, in U.S. Pat. No. 4,085,193 (dated 1978) by Nakajima et al., various metal compound catalysts are disclosed which employs titania as the catalyst support, and includes various metals such as Mo, W, Fe, V, Ni, Co, Cu, Cr, U and the like. Recently, in order to improve the disadvantages of present SCR catalysts, the various physicochemical functions were included into the new generation of the SCR catalyst. Particularly, the sulfur tolerance of the catalyst for $SO_2$ commonly contained in the flue gas as well as NO is very important for the commercialization of the SCR process. As described before, the disadvantages of the titania as the carrier for the SCR process are attempted to be improved. For this purpose, many researches have been carried out to develop a new carrier which is related to the properties of the titania.

In U.S. Pat. No. 4,735,927 (dated 1988) and U.S. Pat. No. 4,735,930 (dated 1988) by Gerdes et al., the catalysts for removing NOx are disclosed which contains anatase titania including a proper amount of hydrogen type or ammonium type zeolite and a proper amount of sulfate by impregnating a vanadium, molybdenum or copper compound onto the support.

In U.S. Pat. No. 4,929,586 (dated 1990) by Hegedus et al., a titania containing the bimodal pore size distribution at about 60 nm is employed as the carrier for SCR catalyst, thereby improving NOx removal activity and the catalyst deactivation. The titania is mixed with the porous inorganic oxides such as $SiO_2$, $Al_2O_3$, $ZrO_2$, $AlPO_4$, $Fe_2O_3$ and their mixtures. $V_2O_5$, $MoO_3$, $WO_3$, $Fe_2O_3$, $CuSO_4$, $VOSO_4$, $SnO2$, $Mn_2O_3$, and $Mn_3O_4$ are employed as an active component on the catalyst surface.

In U.S. Pat. No. 5,415,850 (dated 1995) by Yang et al., a selective reducing method using various PILC catalysts is disclosed. Here, in the PILC catalysts, iron oxide, chromia, titania, zirconia and alumina are pillared, and among them, the most superior one is the delaminated Fe-PILC. Furthermore, when chromia and iron oxide are impregnated onto the Ti-PILC at a proper ratio, the SCR reaction for reducing NOx by $NH_3$ as a reducing agent showed the most superior performance. These catalysts also contain the bimodal pore size distributions depending on the preparation method of PILC, and the catalyst deactivation has been improved. However, vanadia has never been suggested as an active component for PILC catalyst.

SUMMARY OF THE INVENTION

The present invention is intended to overcome the above-described disadvantages of the conventional SCR catalyst.

Therefore, it is an object of the present invention to provide a new catalyst in which the disadvantages of the conventional vanadia-titania catalysts are complemented, so that a superior activity for removing NOx can be realized, and that the catalyst exhibit strong tolerance against the various deactivation factors.

It is another object of the present invention to provide a catalyst containing a superior mechanical strength, a high surface area and a versatile pore size distribution. It will achieve high performance of NO removal activity compared to the conventional vanadia-titania catalyst. The catalyst deactivation can also be improved. In addition, extrudability of the catalyst for the development of a low pressure drop reactor such as honeycomb can be improved. For Ti-PILC, titania is pillared into space between the layers of the clay.

It is still another object of the present invention to provide a catalyst in which the operation temperature window shifts to the lower reaction temperature so as to improve the energy economy, and NOx removal activity is improved so as to decrease the size of the reactor enhancing the pressure drop over the reactor, thereby achieving an economical and efficient operation of the SCR process.

BRIEF DESCRIPTION OF THE DRAWINGS

FIG. 1 is an illustration of the peak for (001) plane by the result of XRD to confirm the pillaring of titania on clay.

FIG. 2 is an illustration of the variations of the pore structures due to the pillaring of titania on clay.

FIG. 3 is an illustration of the surface acidity of the catalysts with respect to the degree of the pillaring of titania on clay.

DETAILED DESCRIPTION OF THE PREFERRED EMBODIMENT

First, the constitution of the present invention will be described.

In the selective catalytic process for removing NOx by using the catalyst, the variety of the catalysts can be employed depending on the installation location of the SCR process to the exhaust gas stream.

For vanadia-titania catalyst, the catalyst has a strong sulfur tolerance to $SO_2$ contained in the flue gas as well as NO, but it is weak in the mechanical strength, and in the catalyst poisoning by dust including metals. Therefore, the catalyst should be installed between a dust collecting facility and a desulfurization process. Since the catalyst revels high reaction efficiency at the reaction temperature higher than 350° C., the flue gas has to be reheated to the reaction temperature, thereby causing energy inefficiency.

Thus, there is a demand for SCR catalyst in which the catalyst deactivation should be improved, and in which the operation temperature has to be lowered. In addition, there is a demand for a new carrier for the catalyst which is capable of improving the reactivity and the catalyst deactivation, and which improves the mechanical strength and the extrudability, this being one of the targets of the present invention.

The PILC contains unique characteristics such as the two dimensional zeolite-like structure. That is, depending on a species which is to be pillared, the pore size distribution can be adjusted, and a high specific surface area can be achieved. For the preparation of the PILC, it is based on the swelling phenomenon of clay which is a reversible process. By the hydrolysis of the metal salt to be pillared, the polymeric or oligomeric hydroxycations and the interlamellar cations of the clay are ion-exchanged, and they are dehydrated. In this manner, a stable metal oxide is formed between the layers of clay, and this acts as pillars. Many studies have been carried out on the preparation of the PILC including titania, alumina, zirconia, chromia and iron oxide. For the case of the Ti-PILC which is employed in the present invention, the specific manufacturing method will be described in Example 1. In the case of the Ti-PILC which is prepared in the present invention, the insufficient aspects such as the mechanical strength and the specific surface area are reinforced, while maintaining the basic characteristics of the titania intact. Furthermore, the catalyst surface acidity of Ti-PILC which is another important factor for SCR reaction is increased.

The bentonite used in the present invention is smectite mineral which is a clay consisting of fine particles. The major ingredients are montmorillonite, beidellite, and saponite mixed together. Montmorillonite is an aluminosilicate revealing the variety of physicochemical properties depending on the chemical composition such as Ca, K, Na and Mg, ion-exchangeable cations. If the cation is sodium (Na), the volume of bentonite becomes 15 times larger than that before swelling by the adsorption of moisture. In the case where the replaceable cation is Ca, it is a non-swelling type bentonite. The pillaring phenomenon is based on a reversible swelling process, and therefore, the bentonite which is used in the present invention is the one in which the replaceable cations are prevalent, and the sodium ion-exchanges have been mainly employed.

The Ti-PILC which is used in the present invention contains the variety of physical and chemical properties depending on the preparation conditions and processes. Particularly, the precursor of the titania as a pillaring agent is important for the characteristics of Ti-PILC. In the present invention, a good result could be reaped by using the titanium alkoxides such as titanium tetrachloride ($TiCl_4$), titanium tetraethoxide ($Ti(OC_2H_5)_4$), titanium tetra-n-propoxide ($Ti(OCH_2CH_2CH_3)_4$), titanium tetraisopropoxide ($Ti[OCH(CH_3)_2]_4$), and titanium tetra-n-butoxide ($Ti[O(CH_2)_3CH_3]_4$). Of these, the most efficient Ti-PILC could be obtained when titanium tetrachloride is used. For the preparation condition of Ti-PILC, the number of moles of Ti per gram of clay should be preferably 1 to 100 mmol, and more preferably should be 2 to 50 mmol.

The catalyst deactivation by the poisoning of $SO_2$ and metals included in the flue gas can be controlled by adjusting the structural factors of the catalyst support which is used as a carrier. That is, the pore size distribution can be tailored. That is, macropores of several microns and micropores of several angstroms simultaneously exist by the design of the pore size distribution of the catalyst. In this manner, the catalyst poisons containing a low diffusion rate are tend to be adsorbed into the macropores, and thus, the macropores serve as a filter for the catalyst poisons, thereby improving the catalyst deactivation. Further, by expanding the pore size, the pores can be prevented from being clogged by the ammonium sulfate which is the deactivation precursor for SCR process. The Ti-PILC contains the variety of pore sizes and structures, and by using this catalyst support in the present invention, the catalyst deactivation by the poisons can be improved.

In removing NOx by using the catalyst prepared in the present invention, the vanadia impregnated onto Ti-PILC performs as the major active component. The amount of the vanadia which is impregnated onto the carrier should be preferably 0.5–20 wt %, and more preferably should be 1–10 wt %. However, the optimum vanadia content which shows the highest activity for NOx reduction by $NH_3$ is greatly influenced by the catalyst support employed for a SCR catalyst. Even with the same carrier, the differences are significant depending on the specific surface areas, the pore structures and the physical and chemical surface properties of the support.

The actual examples described below are presented for comparing the present invention with the conventional methods. The examples described below are only for describing the present invention, and not for limiting the scope of the present invention which will be defined in the appended claims. The ppm unit is based on volumes, unless specified.

EXAMPLE 1

Preparation of Ti-PILC

The Ti-PILC carrier was prepared in the manner as described below.

The carrier in which the titania was pillared was manufactured by the generally known method. The clay which constituted the major component of the PILC was a bentonite which contained montmorillonite as the main ingredient. That is, the active sodium bentonite of Fisher company was used which contained bentonite, montmorillonite, beidellite and saponite. As the precursor of the titania, titanium tetrachloride and titanium alkoxide were employed. As to the specific manufacturing process, first, about 10 g of clay was mixed with about 0.5–1.5 L of distilled water, and an agitation was carried out for more than 5 hours. Then the titanium precursor was added into hydrochloric acid solution (HCl) of 2M. Then distilled water was slowly added, and thus, a pillared solution was prepared which contained a titanium concentration 1 of 0.1–2.0 M, and a hydrochloric acid concentration of 0.1–2.0 M. Then this solution was aged at the room temperature for about 12 hours. Again, this solution was slowly added to a clay suspended solution, and then an agitation was carried out for about 12 hours. The number of moles of titania was maintained to 1–50 mmol per gram of clay during the cause of the preparation. Filtering and washing were carried out. Then a part of the product was dried at a temperature of 110° C. for 12 hours under an air atmosphere, while the rest of them were treated by freeze-drying method to design the appropriate pore size distribution. The dried sample was calcinated by increasing the temperature up to 300° C. at a raising rate of 2° C./min, and by maintaining it at 300° C. for 5 hours.

EXAMPLE 2

Preparation of $V_2O_5$/Ti-PILC

The vanadia catalyst which vanadia was impregnated onto the Ti-PILC was prepared in the manner as described below.

The vanadia catalyst was manufactured in the generally known method. Here, the precursor of the vanadia was ammonium meta-vanadate ($NH_4VO_3$). As to the manufacturing process, first the precursor of the vanadia was measured as much as required. Then it was dissolved in a distilled water, and by using oxalic acid (COOHCOOH), the powder Ti-PILC carrier was mixed with the solution while keeping the solution at pH=2.5–3.0. Then an agitation was carried out for about 2 hours, and the water was evaporated by using a rotary evaporator. The product was dried at the temperature of 110° C. for 12 hours, and then, a calcination was carried out at 500° C. for 5 hours, thereby completing the manufacture of the vanadia catalyst. Here, the content of the vanadium in the catalyst was 1 to 10 wt %.

EXAMPLE 3

Reference Catalysts

Reference catalysts were prepared in the following manner.

In order to compare with the $V_2O_5$/Ti-PILC catalyst of the present invention, vanadia catalysts which were impregnated onto various carriers were manufactured in the same method as that of Example 2. However, instead of the Ti-PILC carrier, the carriers prepared were the titania ($TiO_2$) from Degussa company, the alumina ($Al_2O_3$, specific surface area: 100 $m^3$/g) from Norton company, and the zirconia ($ZrO_2$) from Hayashi Pure Chemical Industries. The vanadium was contained in an amount of 2 wt %, and in the case of the vanadia catalyst which was impregnated onto the alumina, the vanadium was contained in an amount of 8 wt % in order to maintain the high NO removal activity of the catalyst.

Another reference catalysts were prepared which are basically Ti-PILC catalysts containing the variety of metals such as Mn, Cr, Fe, Na and Cu to demonstrate the superior performance of $V_2O_5$/Ti-PILC catalyst for the reduction of NO by $NH_3$. These catalysts were prepared by the generally known incipient wetness method, and the content of the metals on the catalyst surface was 1 wt %. The precursors of the metals employed for the preparation of the reference catalysts were manganese (II) acetate tetrahydrate (Junsei Chemical Co.), chromium (III) nitrate nonahydrate (Aldrich), iron (III) nitrate enneahydrate (Kokusan Chemical Works), nickel (II) nitrate hexahydrate (Junsei Chemical Co.), and Copper (II) nitrate trihydrate (Junsei Chemical Co.).

The commercial $V_2O_5$—$WO_3$/$TiO_2$ was also employed as a reference catalyst. The contents of $V_2O_5$ and $WO_3$ were 2.0 wt % and 6.0 wt %, respectively.

EXAMPLE 4

Confirmation of the Pillaring Effect of Ti-PILC Catalyst

In order to make sure the pillaring effect of the Ti-PILC catalyst, various physical properties were measured. The variation of the specific surface area and the pore structure of the catalysts after the pillaring were measured by BET apparatus (ASAP2010, Micromeritics) based on BET, BJH and Horvath-Kawazoe methods.

In the present invention, in order to confirm the pillaring of titania in the clay, the XRD analysis was carried out by x-ray diffractometer (M18XHF, MAC Science Co.) with Cuka (1=0.15405 nm) as an optical source. The measurements were carried out at an angle ranged from 2 to 40°.

In the present invention, for the measurement of the surface acidity in accordance with the pillaring of titania on clay, the $NH_3$ was adsorbed onto the catalyst, and then, a temperature programmed desorption test was carried out. 0.2 g of the catalyst was installed in a U shaped micro-reactor which has an outside diameter of ¼inch. Then, a pre-treatment was carried out at a temperature of 500° C. for 2 hours under a helium atmosphere. After the pre-treatment, a pure $NH_3$ of 99.995% was adsorbed at 100° C. for 1 hour. After the absorption of $NH_3$, the catalyst was sufficiently purged at 100° C. by using a pure helium of 99.9999%, and then, helium was let to flow at a rate of 50 $cm^3$/min by raising the temperature at the rate of 10° C./min from 100° C. to 900° C. During this process, the amount of $NH_3$ desorption was measured by using TCD (thermal conductivity detector) of GC. The $NH_3$ desorption was confirmed by an on-line mass spectroscopy (QMS, VG Quadrupoles).

The Ti-PILC catalysts prepared in the present invention contain the following physical and chemical properties.

Table 1 shows the variations of the pore volumes and the specific surface areas of the Ti-PILC catalysts, which were prepared through the pillaring method. It was observed that the surface area of the pillared catalyst is 10 times larger than that of the unpillared clay, and at least 3 4 times higher than that of titania. Meanwhile, for the freeze-dried catalyst, the specific surface area, and the pore volume were somewhat more increased.

TABLE 1

Comparison of physical properties of Ti-PILC

| | Prepared condition (mmol Ti/g clay) | Surface area* (m$^2$/g) | Pore volume* (cm$^3$/g) |
|---|---|---|---|
| Unpillared clay | — | 25.5 | 0.08 |
| Ti-PILC | 2 | 162 | 0.12 |
| Ti-PILC | 5 | 220 | 0.19 |
| Ti-PILC | 10 | 254 | 0.22 |
| Ti-PILC 1) | 10 | 273 | 0.26 |
| Ti-PILC | 20 | 243 | 0.28 |
| TI-PILC 2) | 20 | 261 | 0.34 |
| TiO$_2$ 2) | — | 60 | — |

Note:
*after the calcination at 300° C.
1) prepared by freeze-drying method
2) TiO$_2$ from Degussa FIG. 1 illustrates the peak for (001) plane by the result of XRD to confirm the pillaring of titania on clay. As the contents of the pillared titania increased, the peak intensity of the (001) plane decreased. It shows the fact that the basal spacing of the (001) plane was increased by the pillaring of the titania on clay. Furthermore, as the content of the pillared titania was increased, the peak intensity of the (001) plane was decreased. It reveals that the regular long-ranged layer structure of pillared clay was delaminated. This can be confirmed clearly by the method of freeze-drying of the catalyst prepared in the present invention.

FIG. 2 illustrates the variations of the pore structures due to the pillaring of titania on clay. The mesopores containing a pore diameter of 3.55 nm were well developed when 10 mmol of Ti per gram of clay was employed for the pillaring. Above 20 mmol, the pores of 3.5 nm were slightly decreased, and new pores ranged from 5.5 to 20 nm were formed. Meanwhile, in the case of the freeze-dried catalysts, large pores of 30 nm were newly developed. These large pores are considered to be formed by a house-of-card structure which was developed by the delamination of the regular long-ranged layer structure of clay. These large pores of 30 nm or more may play an important role to improve the catalyst deactivation.

FIG. 3 illustrates the surface acidity of the catalysts with respect to the degree of the pillaring of titania on clay. It was observed that a high surface acidity was examined by the pillaring compared with the conventional titania or clay.

EXAMPLE 5

Selective Reduction of NO Over the Prepared Catalysts and Their Sulfur Tolerance In this example, a fixed-bed flow reactor system was employed, and this system consisted of a gas injection, a reaction and gas analyzing parts. The reactants including NO, NH$_3$ and air were adjusted as to their amounts by using mass flow controllers. They were mixed at a mixing chamber before the fixed-bed flow reactor system. In order to prevent the channeling phenomenon within the reactor, a proper amount of glass beads was placed at the top of the catalyst to carry out an experiment at the reactor space velocity of 100,000/hr. For the catalyst deactivation study by SO$_2$, SO$_2$ was directly injected to the top of the catalyst within the reactor system to avoid the problems caused by the formation of the salts including NH$_3$ and SO$_2$. During the experiment, water can also be included in the feed gas stream by using a H$_2$O bubbler.

The NO removal activity and the sulfur tolerance of the catalyst prepared in the present invention were as follows.

The catalysts of Examples 1–3 were examined as to their selective catalytic reduction reaction of NO based on the process of Example 4 under a nitrogen atmosphere containing 5% of oxygen or under an atmosphere containing SO$_2$ in the feed gas stream. Unless specified, the composition of reaction gas in the present invention was a nitrogen atmosphere containing 500 ppm of NO and NH$_3$, 0–5% of water, and 5% of oxygen, while the catalyst was examined at the reactor space velocity of 100,000/hr, and the reaction temperature of 200–500° C.

Table 2 shows the NO removal activity of the vanadia catalysts with respect to the carriers employed at a dry conditions. In all the carriers except alumina, the contents of vanadium on the catalyst were 2 wt %, and alumina contains 8 wt % of vanadia. In the case of the vanadia catalyst in which the alumina and titania were used as the carriers, the NO removal activity was superior. However, for the vanadia catalysts which were impregnated onto titania from Degussa and alumina without additives, the peak activities were almost same as that of the commercial V$_2$O$_5$—WO$_3$/TiO$_2$ catalyst, but they showed the steeply decreased NO removal activities at the high temperature region due to the NH$_3$ oxidation reaction. However, the V$_2$O$_5$/Ti-PILC catalyst prepared in the present invention showed a superior NO removal activity at the low reaction temperature compared with the commercial V$_2$O$_5$—WO$_3$/TiO$_2$ catalyst even without the addition of MoO$_3$ or WO$_3$ to the catalyst. Furthermore, by inhibiting the NH$_3$ oxidation reaction, the maximum activity of V$_2$O$_5$/Ti-PILC catalyst without any additives was maintained up to the temperature range of the commercial V$_2$O$_5$—WO$_3$/TiO$_2$ catalyst.

TABLE 2

NO removal activities of vanadia catalysts supported on the variety of the carriers.

| | NO conversion (%) Reaction temperature (° C.) | | | | | | |
|---|---|---|---|---|---|---|---|
| Catalyst | 200 | 250 | 300 | 350 | 400 | 450 | 475 |
| V$_2$O$_5$/Ti-PILC | 45 | 74 | 94 | 98 | 99 | 95 | 89 |
| V$_2$O$_5$/TiO$_2$  1) | 43 | 82 | 96 | 97 | 89 | 71 | ND |
| V$_2$O$_5$/Al$_2$O$_3$ | 37 | 79 | 95 | 96 | 93 | 73 | ND |
| V$_2$O$_5$/ZrO$_2$ | 10 | 28 | 45 | 57 | 36 | ND | ND |
| V$_2$O$_5$—WO$_3$/TiO$_2$ 2) | 17 | 53 | 90 | 97 | 98 | 96 | 92 |

Note:
1) TiO$_2$ from Degussa
2) Commercial SCR catalyst.

Table 3 reveals NO removal activities of various metal oxides impregnated onto the Ti-PILC under dry conditions. The metal contents of all the catalysts were uniformly 1 wt %. As observed in Table 3, vanadia impregnated on Ti-PILC showed the highest activity. Cr/Ti-PILC showed slightly higher activity than that of the vanadia catalyst at the temperature below 250° C., but the activity immediately dropped at 300° C., due to the strong $NH_3$ oxidation reaction.

TABLE 3

NO removal activities of Ti-PILC catalysts

| Catalyst | NO conversion (%) Reaction temperature (° C.) | | | | | | |
|---|---|---|---|---|---|---|---|
| | 200 | 250 | 300 | 350 | 400 | 450 | 475 |
| V/Ti-PILC | 16 | 45 | 81 | 97 | 99 | 97 | 94 |
| Mn/Ti-PILC | 23 | 28 | 39 | 59 | 73 | 83 | ND |
| Cr/Ti-PILC | 38 | 79 | 94 | 87 | 82 | 71 | ND |
| Fe/TiPILC | 19 | 22 | 35 | 57 | 77 | 84 | 83 |
| Ni/TiPILC | ND | 25 | 30 | 37 | 51 | 66 | ND |
| Cu/TiPILC | 29 | 38 | 51 | 74 | 85 | 84 | ND |

Table 4 shows the influences of the content of Ti for $V_2O_5$/Ti-PILC catalyst on NO removal activity. The catalysts were prepared when 2, 5, 10 and 20 mmol of Ti per gram of clay were contained during the cause of the pillaring procedure. As the contents of Ti on Ti-PILC increased, the higher NO removal activity has been achieved.

TABLE 4

Effect of the contents of titania on Ti-PILC catalyst on NO removal activity.

| Catalyst | Prepared condition (mmol Ti/g clay) | NO conversion (%) Reaction temperature (° C.) | | | | | | |
|---|---|---|---|---|---|---|---|---|
| | | 200 | 250 | 300 | 350 | 400 | 450 | 475 |
| $V_2O_5$/Ti-PILC | 2 | 29 | 50 | 66 | 75 | 71 | 54 | ND |
| $V_2O_5$/Ti-PILC | 5 | 38 | 71 | 89 | 95 | 96 | 86 | ND |
| $V_2O_5$/Ti-PILC | 10 | 46 | 82 | 96 | 98 | 97 | 88 | ND |
| $V_2O_5$/Ti-PILC 1) | 10 | 45 | 81 | 96 | 98 | 96 | 88 | ND |
| $V_2O_5$/Ti-PILC | 20 | 52 | 87 | 98 | 99 | 98 | 90 | 79 |

Note: 1) prepared by freeze-drying method.

Table 5 exhibits the influences of the vanadium contents of $V_2O_5$/Ti-PILC catalyst prepared in the present invention on the NO removal activity. If the vanadium content was increased from 1% to 5%, the activity were considerably improved at the low reaction temperature, but if it was more than 5% of vanadium content, an immediate decrease of NO removal activity has been observed due to the $NH_3$ oxidation reaction at the high reaction temperature region. From this result, the optimum vanadium content of the catalyst can be examined.

TABLE 5

NO removal activity of the $V_2O_5$/Ti-PILC catalyst with respect to the content of vanadium.

| Vanadium content (wt %) | NO conversion (%) Reaction temperature (° C.) | | | | | | |
|---|---|---|---|---|---|---|---|
| | 200 | 250 | 300 | 350 | 400 | 450 | 475 |
| 1 | 16 | 45 | 81 | 97 | 99 | 97 | 94 |
| 2 | 45 | 74 | 94 | 98 | 99 | 95 | 89 |
| 3 | 52 | 87 | 98 | 99 | 98 | 90 | 79 |
| 5 | 71 | 95 | 99 | 99 | 94 | 71 | ND |

Table 6 shows NO removal activities of the $V_2O_5$/Ti-PILC catalyst with respect to the content of water commonly contained in the feed gas stream. When water included in flue gas the activity decrease was observed in the low temperature regions, but at the high temperature regions, the activity was somewhat increased due to the inhibition of the $NH_3$ oxidation reaction. In addition, when water exists 1 to 5%, no significant loss of the activity has been attained.

TABLE 6

Effect of water in the feed gas stream on NO removal activity of $V_2O_5$/Ti-PILC

| Water content (wt %) | NO conversion (%) Reaction temperature (° C.) | | | | | | |
|---|---|---|---|---|---|---|---|
| | 200 | 250 | 300 | 350 | 400 | 450 | 475 |
| 0 | 52 | 87 | 98 | 99 | 98 | 90 | 79 |
| 1 | 33 | 70 | 92 | 98 | 99 | 98 | 94 |
| 5 | 28 | 66 | 92 | 97 | 99 | 98 | 94 |

Table 7 reveals the comparison of the sulfur tolerance of the catalysts including $V_2O_5$/Ti-PILC, $V_2O_5$/$TiO_2$ and commercial $V_2O_5$—$WO_3$/$TiO_2$. The continuous deactivation test has been carried out at the constant reaction temperature. $SO_2$ of 5,000 ppm was injected into the reactor at the temperature of 250° C. and at the reactor space velocity of 100,000/hr. Note that 250° C. may be the worst reaction condition for the deactivation of SCR catalyst. After carrying out the reaction with $SO_2$, NOx removal activities were measured the same reaction conditions including the reactor space velocity. For $V_2O_5$/Ti-PILC catalyst prepared in the present invention, a higher sulfur tolerance was observed compared with the conventional $V_2O_5/TiO_2$ catalyst, and an almost similar tolerance to the commercial $V_2O_5$—$WO_3/TiO_2$ catalyst. Meanwhile, in the case of the $V_2O_5/Ti$-PILC catalyst which was freeze-dried, a superior sulfur tolerance was observed compared with the commercial $V_2O_5$—$WO_3/TiO_2$ catalyst.

TABLE 7

Sulfur tolerance of $V_2O_5/Ti$-PILC catalyst.

| Catalyst | NO conversion (%) Exposure time (h) | | | | | | | |
|---|---|---|---|---|---|---|---|---|
| | 0 | 2 | 5 | 15 | 25 | 30 | 40 | 55 |
| $V_2O_5/Ti$-PILC | 70 | ND | 64 | 51 | 45 | ND | 40 | 32 |
| $V_2O_5/Ti$-PILC  1) | 71 | ND | 67 | 57 | 50 | ND | 46 | 40 |
| $V_2O_5/TiO_2$ | 77 | 70.8 | 55 | 39 | 33 | 30 | ND | ND |
| $V_2O_5$—$WO_3/TiO_2$  2) | 52 | ND | 62 | 54 | 46 | ND | 38 | 31 |

Note: 1) prepared by freeze-drying method.
2) Commercial SCR catalyst.

EXAMPLE 6

Measurement of the Mechanical Strengths of a Honeycomb Reactor Extruded with the Catalyst Invented in the Present Invention.

The mechanical strength of the catalyst which is most important for the commercialization of the SCR process by the present invention was compared with the commercial SCR catalyst. For this purpose, a honeycomb reactor was extruded with the catalyst prepared in the present invention by an injection molding process, and then, the mechanical strengths were examined by using the instron universal testing instrument (Model 4201). That is, the vertical and horizontal strengths of the reactor were measured.
The mechanical strengths of the honeycomb reactor extruded by SCR catalysts were as follows:

When Ti-PILC was used, the extrudability into the honeycomb reactor was excellent compared with $TiO_2$. Furthermore, as shown in Table 8, the vertical and horizontal mechanical strengths were superior compared with $TiO_2$. It was also confirmed that the mechanical strengths were superior compared with the commercial honeycomb extruded by $V_2O_5$—$WO_3/TiO_2$ catalyst. Table 8 reveals the results of the comparisons in the relative terms. By optimizing the extrusion process for the honeycomb reactor, more improved mechanical strengths are expected.

TABLE 8

Mechanical strength of -honeycomb reactor.

| Composition | CPSI 1) of honey-comb reactor | Vertical strength | Horizontal strength |
|---|---|---|---|
| $V_2O_5$—$WO_3/TiO_2$ | 10 | 8 kgf/cm2 | 3 kgf/cm2 |
| V2O5/Ti-PILC | 10 | 10 kgf/cm2 | 5 kgf/cm2 |
| $V_2O_5$—$WO_3/TiO_2$ 2) | 50 | 9 kgf/cm2 | 6 kgf/cm2 |
| $V_2O_5/Ti$-PILC | 50 | 12 kgf/cm2 | 7 kgf/cm2 |

Note:
1) Cells per square inch.
2) Commercial honeycomb reactor.

According to the present invention as described above, the $V_2O_5/Ti$-PILC catalyst exhibits a superior activity under dry and wet conditions compared with the commercial $V_2O_5$—$WO_3/TiO_2$ catalyst. However, under the wet condition, both the $V_2O_5/Ti$-PILC catalyst prepared in the present invention and the commercial $V_2O_5$—$WO_3/TiO_2$ catalyst reveals the catalyst deactivation at 25 0° C.

What is claimed is:

1. A Ti-PILC (titania pillared interlayer clay) impregnated by vanadia for the reduction of NO in exhaust stream containing $SO_2$ into nitrogen and water, characterized as a $V_2O_5/Ti$-PILC catalyst, including a pillaring effect, prepared by pillaring a titania into at least one clay layer by a pillaring method, wherein the $V_2O_5/Ti$-PILC catalyst contains metal compounds selected from the group consisting of iron, copper, lanthanum and mixtures thereof as additives to the catalyst.

2. The $V_2O_5/Ti$-PILC catalyst as claimed in claim 1, wherein the clay contains montmorillonite, beidellite, saponite, hectorite and nontronite as major ingredients.

3. The $V_2O_5/Ti$-PILC catalyst as claimed in claim 1, wherein the vanadia catalyst contains vanadia as a main ingredient and contains up to 10 wt % of metal compounds selected from the group consisting of iron, copper, lanthanum and mixtures thereof as additives to the catalyst.

4. The $V_2O_5/Ti$-PILC catalyst as claimed in claim 1, wherein a precursor of the titania is selected from the group consisting of titanium tetrachloride ($TiCl_4$); titanium alkoxides including titanium tetraethoxide ($Ti(C_2H_5)_4$), titanium tetra-n-propoxide ($Ti(CH_2CH_2CH_3)_4$), titanium tetraisopropoxide ($Ti[CH(CH_3)_2]_4$), and titanium tetra-n-butoxide ($Ti[O(CH_2)_3CH_3]_4$); and mixtures thereof.

5. The $V_2O_5/Ti$-PILC catalyst as claimed in claim 1, wherein the pillaring method is carried out by an intercalation through ion-exchanges between titanium polyoxcations and cations existing along the at least one layer of the clay.

6. The $V_2O_5/Ti$-PILC catalyst as claimed in claim 1, wherein the pillaring effect is accompanied by increases of specific surface areas, pore volumes, pore sizes and surface acidity.

7. The $V_2O_5/Ti$-PILC catalyst as claimed in claim 1, wherein the Ti-PILC is manufactured with 1–100 mmol of the titania per gram of the clay.

8. The $V_2O_5/Ti$-PILC catalyst as claimed in claim 6, wherein the Ti-PILC has a specific surface area of 30–700 $m^2/g$.

9. The $V_2O_5/Ti$-PILC catalyst as claimed in claim 6, wherein the catalyst contains a multi-pore size distribution ranged from 0.5 to 500 nm.

10. The $V_2O_5/Ti$-PILC catalyst as claimed in claim 1, wherein in the vanadia catalyst, vanadium is impregnated in an amount of 0.5–20 wt % on the surface of the Ti-PILC.

11. The $V_2O_5/Ti$-PILC catalyst as claimed in claim 1, wherein the catalyst reveals strong sulfur tolerance owing to provisions of claims 8 or 9.

12. $V_2O_5$/Ti-PILC catalyst as claimed in claim 1, wherein a selective catalytic reduction of NO is carried out at the temperature ranged from 150 to 600° C.

13. The $V_2O_5$/Ti-PILC catalyst as claimed in claim 7, wherein the Ti-PILC is manufactured with 2–50 mmol of the titania per gram of the clay.

14. The $V_2O_5$/Ti-PILC catalyst as claimed in claim 8, wherein the Ti-PILC has a specific surface area of 80–500 $m^2$/g.

15. The $V_2O_5$/Ti-PILC catalyst as claimed in claim 10, wherein in the vanadia catalyst, vanadium is impregnated in an amount of 1–10 wt % on the surface of the Ti-PILC.

16. The $V_2O_5$/Ti-PILC catalyst as claimed in claim 12, wherein the selective catalytic reduction of NO is carried out at the temperature ranged from 200 to 500° C.

* * * * *